United States Patent [19]
Ferguson et al.

[11] Patent Number: 5,772,350
[45] Date of Patent: Jun. 30, 1998

[54] PROTECTED SWIVEL

[76] Inventors: Robert C. Ferguson, P.O. Box 365, Eau Claire, Mich. 49111-0365; Todd Sutton, 2176 Timberview NE., Grand Rapids, Mich. 49505

[21] Appl. No.: 569,621

[22] Filed: Dec. 8, 1995

[51] Int. Cl.$^6$ ..................................................... F16D 1/12
[52] U.S. Cl. .......................... 403/78; 403/60; 403/164; 403/165; 277/29
[58] Field of Search ................................ 403/60, 66, 78, 403/164, 165; 277/29, 88, 152

[56] References Cited

U.S. PATENT DOCUMENTS

| | | |
|---|---|---|
| 1,478,097 | 12/1923 | Black . |
| 1,642,958 | 9/1927 | Joyner . |
| 2,501,680 | 3/1950 | King . |
| 2,633,375 | 3/1953 | Wilcoxon . |
| 2,833,568 | 5/1958 | Corsette . |
| 2,837,177 | 6/1958 | Edge et al. .......................... 403/165 X |
| 4,462,617 | 7/1984 | Green . |
| 4,478,435 | 10/1984 | Cheshier et al. . |
| 4,600,331 | 7/1986 | Gray ........................................ 403/165 |
| 4,669,907 | 6/1987 | Patton ................................... 403/165 X |
| 4,687,365 | 8/1987 | Promersberger .................... 403/164 X |
| 4,840,409 | 6/1989 | Welkey . |
| 5,076,614 | 12/1991 | Yokomatsu et al. . |
| 5,172,771 | 12/1992 | Wilson . |
| 5,176,211 | 1/1993 | Halderman et al. . |
| 5,242,026 | 9/1993 | Deken et al. . |
| 5,399,042 | 3/1995 | Ivel ......................................... 403/78 X |
| 5,484,220 | 1/1996 | Lewis et al. ........................... 403/78 X |
| 5,494,367 | 2/1996 | Epkens .................................... 403/164 |
| 5,529,421 | 6/1996 | Epkens .................................... 403/164 |
| 5,607,248 | 3/1997 | Hasse ........................................ 403/78 |

*Primary Examiner*—Kenneth J. Dorner
*Assistant Examiner*—Bruce A. Lev
*Attorney, Agent, or Firm*—Waters & Morse, P.C.

[57] ABSTRACT

A protected swivel has first and second members connected in swiveling engagement and a sleeve overlaying and enclosing at least a portion of each of the first and second members. The sleeve is coupled in sealing engagement with the first member to swivel with the first member. A first seal is interposed between the sleeve and the second member for sealing engagement of the sleeve with the first member. A second seal extends between the first member and the second member. The second seal may include a barrier layer of a viscous material. A swivel bearing is interposed between the first and second swivel members, with the second seal extending between the bearing and the second swivel member.

19 Claims, 4 Drawing Sheets

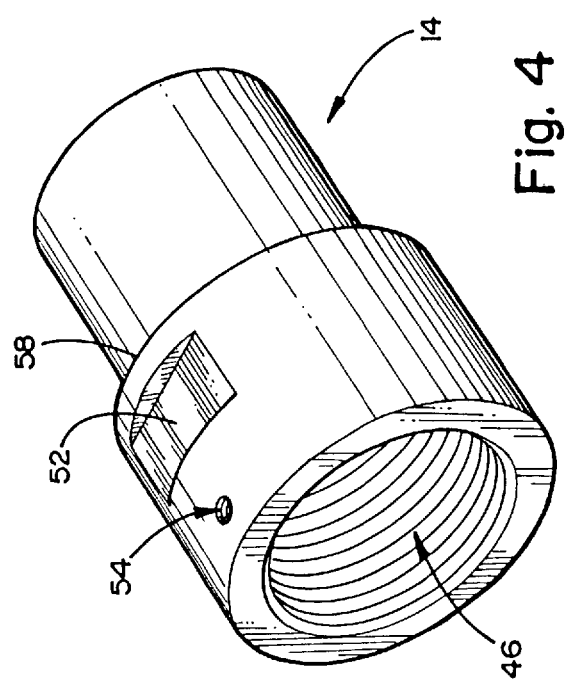

PROTECTED SWIVEL

BACKGROUND OF THE INVENTION

The invention relates to directional, underground boring, and more particularly, two swivel connectors that are used to pull cables, tubes, pipes, and the like through holes that are bored underground.

Directional boring is a technique by which holes can be bored underground with an ability to precisely control the direction of the boring process. The underground boring equipment comprises a boring head that is rotated and driven through the ground by a series of hollow boring rods. After an underground hole is bored, a mud-like slurry of bentonite is commonly pumped through the hollow boring rods to the boring head to reduce friction when the boring rods and head are pulled out of the hole.

Typically, cables, tubes, pipes, or similar items are pulled back through the hole with the boring rods and boring head. The slurry also lubricates the hole for pulling these articles through the hole with the boring equipment. To prevent damage to the articles that are being pulled back through the hole, a swivel connector is used to connect the pulled articles with the boring equipment.

The lubricating slurry creates a very harsh environment, however, for precision components, such as ball bearings that are commonly used in the swivel connector. Thus, currently known ball bearing swivel connectors quickly fail as a result of the lubricating slurry entering the swivel bearing and abrading and corroding the bearing.

SUMMARY OF THE INVENTION

Accordingly, the present invention addresses the above problems with a protected swivel. A protected swivel of the invention has first and second members connected in swiveling engagement, and an outer sleeve that overlays and encloses at least a portion of each of the first and second swivel members. A joint will be defined between the first and second swiveling members and the outer sleeve will overlay and enclose the joint, protecting the swivel engagement between the two members from environmental contaminants. The outer sleeve may be coupled in sealing engagement with the first of the two swiveling members to swivel with that member, while a seal may be provided between the outer sleeve and the second of the two swiveling members.

A second seal may extend between the first and the second swiveling members. The second seal may include a barrier layer of a viscous material. A bearing may also be interposed between the first and the second swiveling members. Further, the second seal may extend between the bearing and the second swivel member.

These and other features, objects, and benefits of the invention will be recognized by those who practice the invention and by those skilled in the art, from the specification, the claims, and the drawing figures.

BRIEF DESCRIPTION OF THE DRAWINGS

FIG. 4 is a perspective view of the swivel body of the swivel of FIG. 1.

DESCRIPTION OF THE PREFERRED EMBODIMENT

Figure 1:
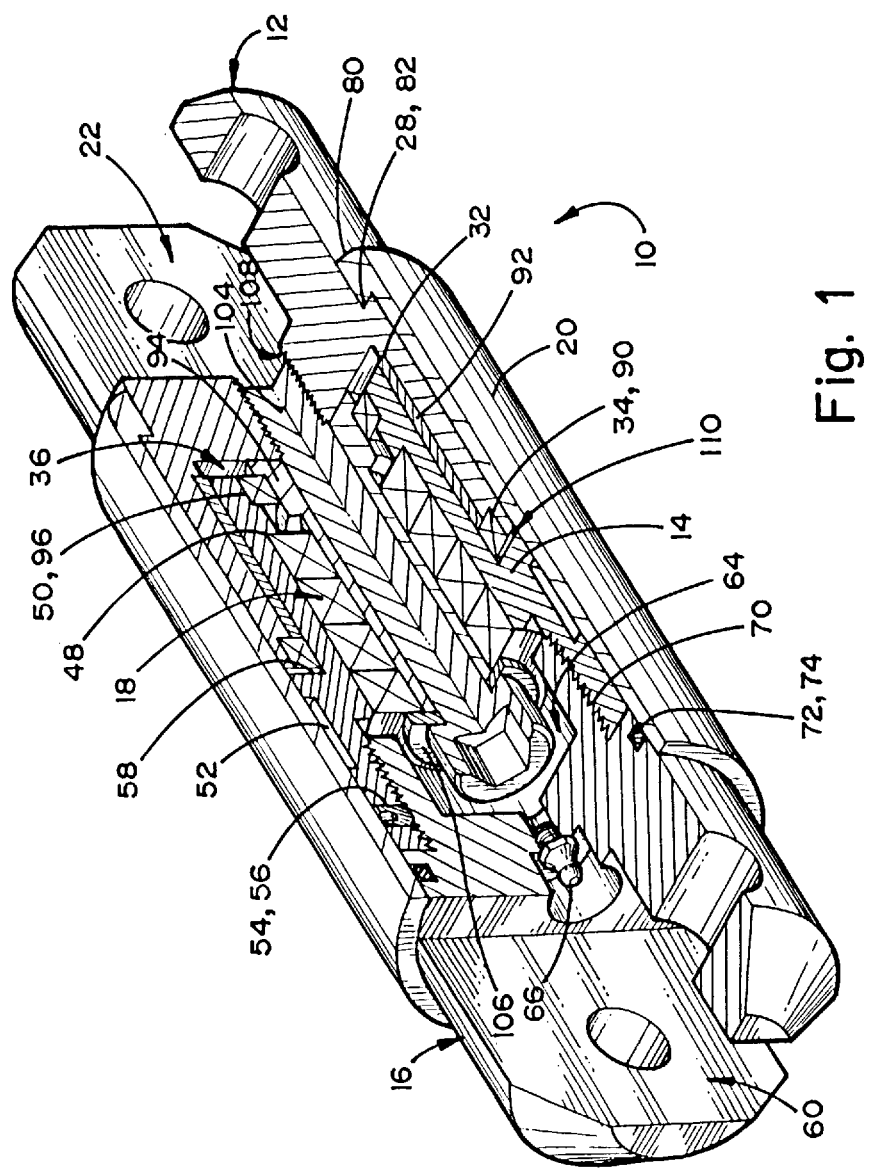
FIG. 1 is a perspective view showing one embodiment of a protected swivel according to the present invention in one-quarter section cut away.

A preferred embodiment of a protected swivel according to the present invention is generally shown in the drawing figures and identified by reference numeral 10. Swivel 10 is about 11.7 inches (297.2 mm) long and about 3.5 inches (88.9 mm) in diameter and includes a front member 12, a swivel body 14, a back member 16, a bearing set 18, and an outer sleeve 20 (FIGS. 1–4).

Figure 2:
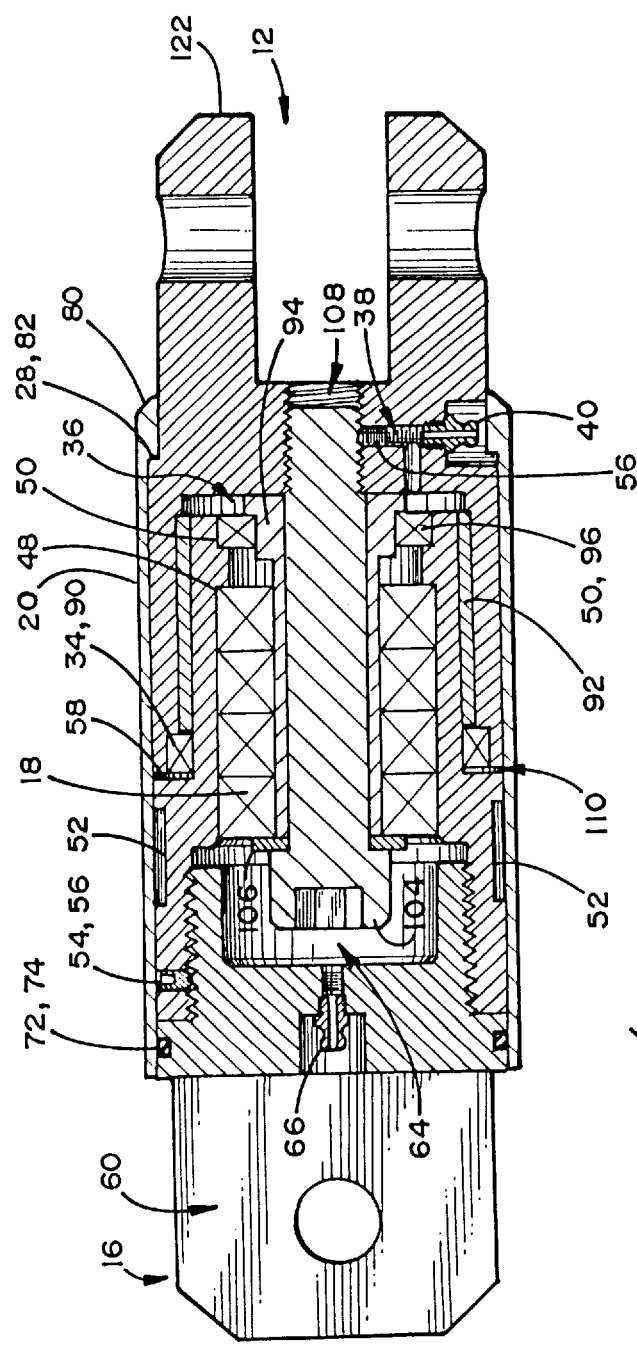
FIG. 2 is a longitudinal cross-sectional view of the swivel of FIG. 1.
Figure 3:
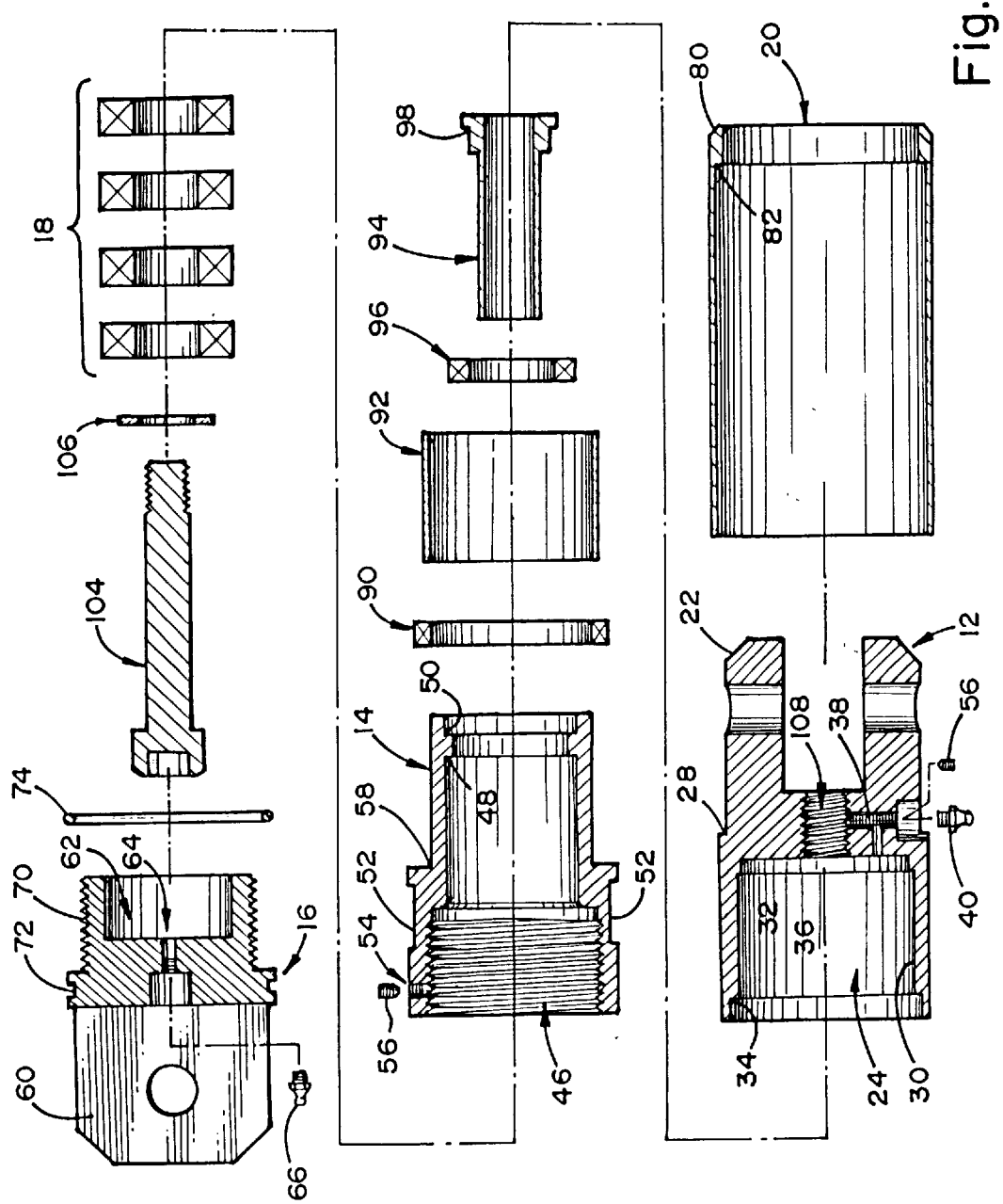
FIG. 3 is an exploded view of the view of FIG. 2.

The front member 12 is a generally cylindrical piece of about 6.25 inches (158.75 mm) in length and about 3.25 inches (82.55 mm) in diameter. Most preferably, the front member 12 is made of steel and is case hardened to Rockwell C30–C40 to a minimum depth of about 0.030 inch (0.762 mm) on the outside surface. The front member has a standard clevis pin connector 22 at one end, a cylindrical recess 24 (FIG. 3) in an opposing end, and a sleeve stop 28 formed by an about three-sixteenths inch (4.76 mm) step on its outer surface, near the clevis pin connector 22 (FIGS. 1–3). The clevis pin connector 22 is of standard configuration with an about 1.25 inch (31.75 mm) space between a pair of pin ears and is used with a common clevis pin of about three-quarters inch (19.05 mm) diameter to connect the swivel 10 with underground hole boring equipment, more particularly a boring head or boring rods.

The recess 24 is about 2.63 inches (66.8 mm) deep with a side wall 30 (FIG. 3) that progressively steps from about 3.0 inches (76.2 mm), to about 2.75 inches (69.85 mm), and to about 2.63 inches (66.8 mm) in diameter to define a bushing seat 32, a seal seat 34, and a grease space 36, respectively (FIGS. 1–3). A grease passage 38 and a grease fitting 40 (FIGS. 2 and 3) are provided in front member 12 to supply grease to the grease space 36 as are commonly known (FIGS. 1–3). The grease fitting 40 is recessed into the side of front member 12 to clear the outer sleeve 20, when the outer sleeve 20 is installed.

The swivel body 14 (FIGS. 1–4) is a generally tubular member with an about 4.81 inch (122.17 mm) length and an about 3.25 inch (82.55 mm) diameter. As with the front member 12, discussed above, the swivel body 14 is also most preferably made of steel and case hardened to Rockwell C30–C40 to a minimum depth of about 0.030 inch (0.762 mm) on the outside surface. The swivel body 14 has an about two inch (50.2 mm) diameter inner aperture 46 with an about 0.354 inch (8.99 mm) wide ridge that is inset about 0.328 inch (8.33 mm) from one end of the swivel body 14, and extends about 0.205 inch (5.21 mm) radially inward to define both a bearing seat 48 and a seal seat 50. An opposing end of the interior aperture 46 is provided with a 2¾-6 UNC interior thread for screw connection with the back member 16. The swivel body 14 is, therefore, also provided with a pair of opposing, parallel exterior flats 52 (FIGS. 1–4) that are cut about one-eighth of an inch (3.175 mm) deep into the outer surface of the swivel body 14, for using a wrench or the like to screw the swivel body 14 and back member 16 together. A ¼-8 UNC threaded set screw hole 54 is also provided in the swivel body 14 to assure tight connection between the swivel body and the back member 16 with a set screw 56. Near the wrench flats 52, and opposite the set screw 56, swivel body 14 also has an exterior seal seat 58.

As with the front member 12, the back member 16 (FIGS. 1–3) is a generally cylindrical piece of about 4.563 inches (115.9 mm) in length and about 3.25 inches (82.55 mm) in diameter. Most preferably, the back member 16 is also made of steel and is case hardened to Rockwell C30–C40 to a minimum depth of about 0.030 inch (0.762 mm) on the outside surface. The back member 16 has a standard clevis pin connector 60 at one end, discussed in greater detail above regarding the front member 12, a recess 62 (FIG. 3) in an opposing end, and a grease fitting 66 that is protectively located in the clevis pin connector 60. The recess 62 is about two inches (50.8 mm) in diameter, about one inch (25.4 mm) deep, and defines a second grease space 64 in the swivel 10.

To couple the back member 16 with the swivel body 14, a cooperating 2¾-6 UNC exterior thread is provided on the exterior surface of the back member 16, surrounding the recess 62 (FIGS. 1–3). A seal seat 72 also circumscribes the exterior of back member 16, between the clevis pin connector 60 and threaded portion 70, to receive an O-ring seal 74 or the like for sealing between the back member 16 and outer sleeve 20.

The outer sleeve 20 is a generally tubular member with a length of about 6.5 inches (165.1 mm), an outer diameter of about 3.48 inches (88.39 mm), an inner diameter of about 3.281 inches (83.34 mm), and an about forty-five degree exterior taper 80 at a front end to facilitate pulling the swivel 10 through an underground hole (FIGS. 1–3). A positioning stop 82 is formed by a lip that extends about 0.109 inches (2.77 mm) inwardly from the interior surface of the outer sleeve 20 at the front end. The positioning stop 82 cooperates with the exterior stop 28 of the front member 12 to position the outer sleeve 20 relative to front member 12 and back member 16. The outer sleeve 20 is connected with back member 16 in rotatably sealing engagement, at a back end of the outer sleeve 20, by the O-ring 74 seated on the exterior of back member 16.

While the swivel components just described may be machined or otherwise appropriately fabricated to assemble the swivel 10, the swivel 10 may also be assembled by sliding a seal 90 over swivel body 14 to set the seal 90 in seal seat 58 (FIGS. 1–3). An annular bushing 92 may also be slid over the swivel body 14 and located adjacent the seal 90 in accordance with common machine tool practice to minimize wear between the swivel body 14 and front member 12, as will be understood by one skilled in the art. Bearing set 18 may be inserted into the interior aperture 46 of swivel body 14, so that the bearing set 18 abuts against the bearing seat 48. Bearing set 18 may be any suitable bearing arrangement, including a standard swivel bearing set that has multiple ball bearing races, four as shown in the drawings, for example.

With the bearing set 18 seated in the swivel body 14, an inner sleeve 94 with an inner seal 96 may be inserted through the bearing set 18 (FIGS. 1–3). The inner sleeve 94 is a generally tubular member having a length of about 3.25 inches (82.55 mm), an outer diameter of about 0.98 inches (24.89 mm), an inner diameter of about 0.765 inches (19.43 mm), and an about 1.5 inch (38.1 mm) diameter head that extends about 0.625 inches (15.875 mm) along the length of the inner sleeve 94, from one end of the inner sleeve 94. As shown in the drawings, the inner sleeve 94 spaces the head of a cap screw 104 and a washer 106 from the front member 12 to define a bearing space between the washer 106 and the bearing seat 48 and to limit preloading of the bearing set 18. The combination of the bushing 92, the swivel body 14, the bearing set 18, the inner sleeve 94, and the two seals 90 and 96, make up a bearing assembly that may be seated in the recess 24 (FIG. 3) of front member 12. The bearing assembly is held in front member 12 with the cap screw 104 and flat washer 106 (FIGS. 1–3). The cap screw 104 engages and is threaded into a threaded aperture 108 that is provided at the bottom of recess 24 (FIG. 3) in front member 12. A second set screw 110 threads into a portion of grease passage 38, under grease fitting 40, to "set" cap screw 104 securely in engagement with aperture 108.

The back member 16 may then be threaded into sleeve 20 and secured with the set screw 56 (FIGS. 1–3). Thus far assembled, grease may be inserted into the two grease spaces 36 and 64 by way of the grease fittings 40 and 66, respectively. At least the grease space 36 must now be filled with grease because the grease fitting 40 of front member 12 will be covered by outer sleeve 20 and will not be accessible when the outer sleeve 20 is assembled in place over front member 12 and back member 16. It is noted that the grease space 36 not only provides lubrication to the swivel 10, but also forms another seal, in the form of a viscous layer, to keep the bearing 18 clean.

Finally, the outer sleeve 20 is slid over front member 12 until it is positioned to overlay and enclose at least a portion of each of the front member 12 and the back member 16 with stop 82 abutting stop 28. Outer sleeve 20 is also noted to enclose and protect a joint 110 that is defined between the front and back members 12 and 16, respectively.

It will be understood by those who practice the invention and by those skilled in the art, that various modifications and improvements may be made to the invention without departing from the spirit of the disclosed concept. The scope of protection afforded is to be determined by the claims and by the breadth of interpretation allowed by law.

I claim:

1. A swivel comprising:
   a swivel body that has opposing first and second body ends;
   a first member connected in swiveling engagement with said first body end;
   a bearing interposed between said first body end and said first member;
   a second member connected with said second body end; and
   a sleeve, said sleeve overlaying and enclosing said swivel body and overlaying and enclosing at least a portion of each of said first member and said second member.

2. The swivel defined in claim 1 further including a first seal interposed between said sleeve and said second member.

3. The swivel defined in claim 2 wherein said sleeve is coupled in sealing engagement with said first member to swivel with said first member.

4. The swivel defined in claim 2 further including a second seal, said second seal extending between said first member and said second member.

5. The swivel defined in claim 4 wherein said second seal includes a barrier layer of a viscous material.

6. The swivel defined in claim 4, wherein said second seal is interposed between said swivel bearing and said first member.

7. The swivel defined in claim 2 further including a barrier layer of a viscous material, said barrier layer extending between said first member and said second member.

8. The swivel defined in claim 2 further including a barrier layer of a viscous material, said viscous material extending between said swivel bearing and at least one of said first member and said second member.

9. The swivel defined in claim 1 further including a second seal interposed between said swivel bearing and said first member.

10. The swivel defined in claim 9 further including a barrier layer of a viscous material, said viscous material extending between said swivel bearing and at least one of said first member and said second member.

11. A swivel comprising:

a first member that has two opposing ends, with a recess in one of said two opposing ends;

a second member that has opposing first and second ends, said first end being seated in said recess in swiveling engagement with said first member, so said first member overlays at least a portion of said second member;

a connector at said second end of said second member;

a bearing connected between said first and said second members, whereby said first and said second members are connected in swiveling engagement; and a sleeve, said sleeve overlaying and enclosing at least a portion of said first member, so at least a portion of said first member is interposed between said sleeve and said second member, said sleeve extending from said first member to overlay and enclose each of said bearing and said second member, and to overlay and enclose at least a portion of said connector.

12. The swivel defined in claim 11 further including a first seal interposed between said sleeve and said second member.

13. The swivel defined in claim 12 wherein said sleeve is coupled in sealing engagement with said first member to swivel with said first member.

14. The swivel defined in claim 12 further including a second seal, said second seal extending between said first member and said second member.

15. The swivel defined in claim 14 wherein said second seal includes a barrier layer of a viscous material.

16. The swivel defined in claim 12 further including a barrier layer of a viscous material, said barrier layer extending between said first member and said second member.

17. A swivel comprising:

a bearing, said bearing having a first bearing side and an opposing second bearing side;

a first member, said first member having a first end and having an opposing second end connected with said first bearing side, the second end having a recess therein;

a first connector at said first end of said first member;

a second member, said second member having a first end and having an opposing second end connected with said second bearing side, said second end of said second member being seated in said recess so said first member overlays a portion of said second member;

a second connector at said first end of said second member;

a seal extending between said bearing and one of said first and said second members; and a sleeve coupled in sealing engagement with one of said first and said second connectors, said sleeve extending from said one of said first and said second connectors to the other of said first and said second connectors, said sleeve overlaying and enclosing said bearing, said seal, one of said first and said second members, and at least a portion of the other of said first and said second members, so at least a portion of said first member is interposed between said sleeve and said second member.

18. The swivel defined in claim 17 wherein said seal is a first seal and said swivel further includes a second seal interposed between said sleeve and the other of said first and said second members.

19. The swivel defined in claim 18 wherein said second seal includes a barrier layer of a viscous material.

* * * * *